United States Patent [19]

Okita

[11] Patent Number: 4,533,565

[45] Date of Patent: Aug. 6, 1985

[54] METHOD FOR SURFACE TREATMENT OF FERROMAGNETIC FINE POWDER AND FORMING A MAGNETIC RECORDING DEVICE

[75] Inventor: Tsutomu Okita, Shizuoka, Japan

[73] Assignee: Fuji Photo Film Co., Ltd., Kanagawa, Japan

[21] Appl. No.: 613,759

[22] Filed: May 24, 1984

Related U.S. Application Data

[63] Continuation of Ser. No. 449,813, Dec. 14, 1982, abandoned.

[30] Foreign Application Priority Data

Dec. 14, 1981 [JP] Japan ................................. 56/201310

[51] Int. Cl.$^3$ .............................................. H01F 10/02
[52] U.S. Cl. ...................................... 427/44; 427/127; 427/128; 427/130; 427/132
[58] Field of Search ................................. 427/127–132, 427/48, 44

[56] References Cited

U.S. PATENT DOCUMENTS 3,790,407  2/1974  Merten ................................ 117/235
4,335,183  6/1982  Hosaka ............................... 428/336

Primary Examiner—Bernard D. Pianalto
Attorney, Agent, or Firm—Sughrue, Mion, Zinn, Macpeak, and Seas

[57] ABSTRACT

A method for the surface treatment of a ferromagnetic fine powder is disclosed. The method increases the dispersibility of the powder in a magnetic coating composition. The method comprises subjecting a magnetic composition to a dispersing processing, with the magnetic composition containing (1) a ferromagnetic fine powder, (2) at least one polar compound selected from a group consisting of such compounds as to have one or more of —COOH, —CONH$_2$, —CONH$_2$, —PO$_3$H, —SO$_3$H, —OH or —NH$_2$ in a molecule and quaternary ammonium salts, and (3) an organic solvent capable of dissolving the polar compound, and evaporating the organic solvent from the magnetic composition.

7 Claims, No Drawings

METHOD FOR SURFACE TREATMENT OF FERROMAGNETIC FINE POWDER AND FORMING A MAGNETIC RECORDING DEVICE

This application is a continuation of application Ser. No. 449,813, filed 12/14/82, abandoned.

FIELD OF THE INVENTION

This invention relates to a method for producing a magnetic recording material and, more particularly, to a method for the surface treatment of a ferromagnetic fine powder, which can increase the dispersibility of the ferromagnetic fine powder in a magnetic coating composition, and when employed in a process of producing a magnetic recording material, can contribute to improvements in electromagnetic characteristics and abrasion resistance of the resulting magnetic recording material.

BACKGROUND OF THE INVENTION

In recent years, the demand for magnetic recording materials which enable a large amount of information to be recorded in a small area thereof have increased. Consequently, the need of improvement in the dispersibility of a ferromagnetic fine powder has increased. Poor dispersibility of a ferromagnetic fine powder is responsible for low storage stability of the magnetic coating composition containing it, and decreases the signal output and increases the noise in the magnetic recording material using such a magnetic coating composition.

An improvement in the dispersibility of a ferromagnetic fine powder makes it possible for the powder to be given a high density charge and thereby, a high level of output can be gained and further, recording of a large amount of information in a small area becomes feasible. In addition to the high density recording, the magnetic recording material can be used under severe conditions in a recording and reproducing apparatus. However, various troubles may arise. For example, the magnetic layer coated may be worn off by repeated use thereby contaminating a running passage of the tape, or cause a drop in output of reproduced signals, fluctuation of output, drop out, an increase in noise and the like. One of the causes of these undesirable phenomena is the insufficient binding power of a binder to a ferromagnetic fine powder.

Special attention has been given with respect to dispersing a ferromagnetic fine powder into a binder as homogeneously as possible and to sticking the dispersed ferromagnetic fine powder firmly to the binder the preparation of a magnetic coating composition to be employed in a magnetic recording material. Known methods for preventing aggregation of a ferromagnetic fine powder from occurring in the magnetic coating composition and for heightening dispersibility of the ferromagnetic fine powder therein include (1) a method of adding to a magnetic coating composition a low molecular weight compound, e.g., ether compounds, quaternary ammonium salts, phosphoric acid esters, fatty acids, oxy compounds or the metal salts thereof, etc. as disclosed in Japanese Patent Application (OPI) Nos. 58804/74, 18006/75, 7704/77, 129410/77, 15802/78, 15803/78, 32304/79, etc., and U.S. Pat. No. 4,153,754, (2) a method of adding to a magnetic coating composition a high molecular weight compound as disclosed in U.S. Pat. No. 3,810,840; Japanese Patent Publication Nos. 9779/65, 22063/72, 9841/78, etc., and U.S. Pat. Nos. 3,630,771, 3,634,137 and 3,840,400, and (3) a method of treating a ferromagnetic fine powder with a coupling agent capable of reacting with a ferromagnetic fine powder, such as a silane coupling agent, a titanium coupling agent and the like, as disclosed in Japanese Patent Publication Nos. 125803/78, 125539/80, etc., and U.S. Pat. No. 4,330,600.

However, the above-described method (1) is not desirable because in order to impart excellent dispersibility to a magnetic coating composition it is necessary to add a large amount of low molecular weight compound. Accordingly, the resulting magnetic recording material can not have high mechanical strength, or the low molecular weight compound oozes out on the surface of a magnetizable layer causing a blooming phenomenon, which decreases the value of the recording material as a comodity or contaminates the running course of the tapes. The above-described method (2) is also defective because the mechanical strength of the magnetic recording material is detrimentally influenced by the high molecular weight compound added. Further, the method does not produce a tape with excellent abrasion resistance and a low coefficient of friction. The above-described method (3) may not be useful in practice because the surface treatment with a coupling agent is sensitive to moisture present at the surface of the ferromagnetic fine powder or the water content of the organic solvent used. Accordingly, it is difficult to control of the water content to the extent necessary for obtaining excellent dispersibility.

SUMMARY OF THE INVENTION

As a result of examining various methods with the intention of obviating the above-described defects, the present inventor has surprisingly found that a magnetic coating composition excellent in dispersibility and in its turn, a magnetic recording material excellent in both abrasion resistance and electromagnetic transformation characteristics can be obtained by using a ferromagnetic fine powder which was subjected to a particular surface treatment.

A first object of the invention is to provide a ferromagnetic powder which can contribute to the improvement of the electromagnetic transformation characteristics of a magnetic recording material.

A second object of this invention is to provide a ferromagnetic powder which can greatly contribute to increasing the abrasion resistance of a magnetic recording material.

A third object of this invention is to provide a ferromagnetic fine powder which can contribute to the attainment of high storage stability of a magnetic coating composition.

A fourth object of this invention is to provide a ferromagnetic fine powder which can be readily dispersed in a magnetic coating composition.

A fifth object of this invention is to provide a ferromagnetic fine powder which can be subjected to a surface treatment without difficulty.

The above-described objects are attained with a ferromagnetic fine powder having received a surface treatment comprising subjecting a composition constituted with (1) a ferromagnetic fine powder, (2) at least one polar compound selected from a group consisting of compounds containing one or more of —COOH, —CONH$_2$, —PO$_3$H, —SO$_3$H, —OH, —NH$_2$ or —NH$_3^+$OH$^-$ group in a molecule, and (3) an organic solvent capable of dissolving the polar compound (2) to a dispersing processing, and evaporating the organic solvent (3) from the composition.

DETAILED DESCRIPTION OF THE INVENTION

Examples of ferromagnetic powders which can be used in this invention include ferromagnetic iron oxide powder, ferromagnetic chromium dioxide powder, ferromagnetic alloy powder and the like, preferably ferromagnetic iron oxide powder and ferromagnetic alloy powder. The ferromagnetic iron oxide and ferromagnetic chromium dioxide particles which are effective in this invention have an axial ratio ranging from about 2:1 to about 20:1, preferably 5:1 or more, and average length in the range of about 0.2 to about 2.0 μm. The above-described ferromagnetic alloy powder is one which contains about 75 wt% or more of a metal component, with 80 wt% or more of the metal component being one or more ferromagnetic metals (e.g., Fe, Co, Ni, Fe—Co, Fe—Ni, Co—Ni, Fe—Co.Ni, etc.), and contains particles of a length of about 1.0 μm or shorter.

Suitable examples of the polar compounds include compounds having one or more of polar groups selected from a class consisting of —COOH, —CONH$_2$, —PO$_3$H, —OH or —NH$_2$ in a molecule, boiling points of 150° C. or higher, and molecular weights ranging from 70 to 1,000 at temperatures higher than their respective boiling points, and quaternary ammonium salts. Specific examples of such polar compounds include saturated straight chain fatty acids such as butyric acid, valeric acid, caproic acid, enanthic acid, caprylic acid, pelargonic acid, capric acid, undecanoic acid, lauric acid, myristic acid, palmitic acid, margaric acid, stearic acid, arachic acid, behenic acid, etc.; saturated fatty acids having side chains such as isovaleic acid, 2-methylisovaleic acid, di-propylacetic acid, 3,5,5-trimethylhexanoic acid, isodecanoic acid, 2-hexyldecanoic acid, isostearic acid, etc.; unsaturated fatty acids such as acrylic acid, crotonic acid, 2-pentanoic acid, linderic acid, lauroleic acid, myristoleic acid, oleic acid, elaidic acid, erucic acid, linolic acid, linolenic acid, 2-butene-1,4-dicarboxylic acid, etc.; amides of the above-described fatty acids; phosphoric acid esters such as diphenyl phosphate, isopropyl phosphate, phenyl phosphate, dibutyl phosphate, di(2-ethylhexyl)phosphate, dioleyl phosphate, β-acryloyloxyethyl phosphate, etc.; sulfonic acids such as ethylbenzene sulfonic acid, naphthalene sulfonic acid, toluene sulfonic acid, dodecylbenzenesulfonic acid, etc.; alcohols such as octanol, tetradecanol, hexadecanol, etc.; amine compounds such as stearylamine, N-tallow-1,3-diaminopropane, etc.; and quaternary ammonium salts such as lecithin, betaine, $C_{12}H_{25}N^+(CH_3)_2CH_2COO^-$, etc.

Preferred examples of polar compounds are saturated and unsaturated fatty acids such as undecanoic acid, lauric acid, myristic acid, palmitic acid, acrylic acid, oleic acid and the like; phosphoric or sulfonic acids and esters thereof such as isopropyl phosphate, di(2-ethylhexyl)phosphate, β-acryloyloxyethyl phosphate, dodecylbenzenesulforic acid and the like; and quaternary ammonium salts such as lecithin, betaine and the like.

Suitable examples of the organic solvent which can be used in the composition of this invention include ketones such as acetone, methyl ethyl ketone, methyl isobutyl ketone, cyclohexanone, etc.; esters such as methyl acetate, ethyl acetate, butyl acetate, ethyl lactate, glycol acetate monoethyl ether, etc.; ethers such as ethyl ether, glycol dimethyl ether, glycol monoethyl ether, dioxane, etc.; aromatic hydrocarbons such as benzene, toluene, xylene, etc.; chlorinated hydrocarbons such as carbon tetrachloride, chloroform, ethylene chlorohydrin, dichlorobenzene, etc.; alcohols such as methanol, ethanol, propyl alcohol, etc.; and the like. Preferred examples of the organic solvent are methyl ethyl ketone, toluene, cyclohexanone, ethyl acetate, xylene, tetrahydrofuran and the like.

In the magnetic dispersion of this invention, the polar compound is present in an amount of 0.3 to 8 wt% based on the weight of the ferromagnetic fine powder, preferably from 0.5 to 2 wt%, and the organic solvent is present in an amount of 50 to 500 wt% based on the weight of the ferromagnetic fine powder. When the organic solvent is present in a large proportion, a great deal of energy is required for evaporation of the organic solvent, whereas when it is present in a small proportion, homogeneous dispersion can not be achieved.

In kneading and dispersing the composition, various types of kneaders can be used. For example, a two-rod roll mill, a three-rod roll mill, a ball mill, a pebble mill, a trommel, a sand grinder, a Szegvari attritor, a high speed impeller dispersing machine, a high speed stone mill, a high speed impact mill, a disperser, a kneader, a high speed mixer, a homogenizer, an ultrazonic wave dispersing machine, etc. can be used.

Particularly preferred kneaders those providing a high shearing force and include a two-rod roll mill, a ball mill, a sand grinder, a disperser and the like. In a preferred embodiment, the composition is kneaded and dispersed in a ball mill at a rotation of about 1000 to about 2000 rpm.

Evaporation of the organic solvent may be carried out during the dispersing procedure. The organic solvent is generally evaporated when the composition is heated at a temperature of 80° C. to 100° C. Such a procedure may be carried out under reduced pressure. Particular attention should be given to the selection of the evaporation temperature to ensure that it does not exceed the Curie point of the ferromagnetic fine powder used. The proportion of the organic solvent remaining after the evaporation processing is desirably 20 wt% or less, preferably 5 wt% or less based on the weight of the ferromagnetic fine powder. The solvent should be present in this amount to ensure obtaining the effect of the surface treatment.

The surface treatment of this invention is particularly effective when the binder used in the magnetic coating composition contains a compound polymerizable by irradiation with electron beams. On this occasion, if compounds set forth below (which are selected from the above-described polar compounds) are used as a polar compound to be contained in the magnetic dispersion, the resulting magnetic recording material will have improved electromagnetic characteristics as well as markedly increased abrasion resistance.

The abrasion resistance can be markedly increased when the polar compound is a compound having both one or more of a carbon-carbon double bond and one or more of groups selected from a class consisting of —COOH, —CONH$_2$, —PO$_3$H, —SO$_3$H, —OH, —NH$_2$ and —NH$_3^+$OH$^-$. Specific examples of such compounds include unsaturated fatty acids such as acrylic acid, crotonic acid, 4-pentenoic acid, 10-undecenoic acid, etc. and these acid amides; phosphotic acid esters such as β-acryloyloxyethyl phosphate, bis(β-acryloyloxyethyl)phosphate, etc.; sulfonic acids such as vinylsulfonic acid, etc.; alcohols such as diethylene glycol monoacrylate, octanediol monoacrylate, etc.; amines such as 4-vinylpyridine, ethylenediaminemonoacrylic acid amide, etc.; betaines; and the like. Particularly preferred compounds are acrylic acid, crotonic acid and bis($\beta$-acryloyloxyethyl)phosphate.

Suitable examples of binders which can be polymerized by irradiation with electron beams include compounds preferably having a plurality of vinyl or vinylidene carbon-carbon double bonds, more specifically those having an acryloyl group, an acrylamido group, an allyl group, a vinyl ether group, a vinyl thioether group or the like in a molecule, and unsaturated polyesters.

Particularly preferred compounds among the above-described compounds are those having acryloyl groups or methacryloyl groups at both ends of their individual straight chain molecules, and these compounds are cited in A. Vrancken, *Fatipec Congress*, 1119 (1972) as well as U.S. Pat. No. 3,530,100 (incorporated herein by reference to discloses such compounds) and British Pat. Nos. 1,234,684; 1,162,721; 1,162,722; 1,162,723 and 1,162,724. Specifically, they are represented by the following general structural formula:

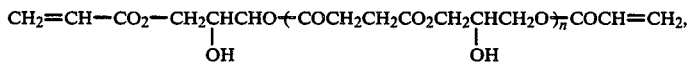

and the polyester skeleton of the above-illustrated compounds may be replaced by a polyurethane skeleton, an epoxy resin skeleton, a polyether skeleton, a polycarbonate skeleton or a combination of two or more of these skeletones. The molecular weight and viscosity of these compounds are not particularly critical. However, it is preferable to use compounds having a viscosity of 1 to 1,000,000 cps at 50° C. and a molecular weight of from 1,000 to 20,000, more preferably 2,000 to 15,000.

In a preferred embodiment of this invention, a monomer which has an unsaturated carbon-carbon bond is added to the binder. Specific examples of such monomers include acrylic acid, methacrylic acid, itaconic acid, methyl acrylate and its analogous (i.e., acrylic acid alkyl esters), methyl methacrylate and its analogues (i.e., methacrylic acid alkyl esters), styrene and its analogues (i.e., $\alpha$-methylstyrene, $\beta$-methylstyrene, etc.), acrylonitrile, methacrylonitrile, acrylamide, methacrylamide, vinyl acetate, vinyl propionate and the like. Monomers having two or more of unsaturated bonds may be also added to the binder. Examples of such monomers include compounds described in *Kankosei Jushi Data Shu* (Collection of Data on Photosensitive Resins), pp. 235–236, KK Sogo Kagaku Kenkyusho (December 1968), U.S. Pat. Nos. 2,760,863, 2,791,504 and 2,927,023; and British Pat. Nos. 834,733 and 854,980. In particular, unsaturated esters of polyols, such as ethylene diacrylate, diethylene glycol diacrylate, trimethylolmethane triacrylate, glycerol trimethacrylate, ethylene dimethacrylate, pentaerythritol tetramethacrylate and the like, and glycidy methacrylates having epoxy rings are preferably employed. Particularly preferred monomers are diethylene glycol diacrylate, trimethylolmethane triacrylate and pentaerythritol tetramethacrylate. In addition, compounds containing one unsaturated bond in a molecule and compounds containing two or more unsaturated bonds in a molecule may be used in the form of a mixture.

Production of magnetic recording materials using ferromagnetic fine powders obtained in accordance with method of this invention can be conducted using known, conventional techniques. When the binder includes an electron beam polymerizable compound, it is indispensable to introduce a step of electron-beam irradiation when producing the magnetic recording material. In this step, electron-beam accelerators of Van de Graaff type scanning system, double scanning system and curtain beam system can be adopted to advantage. In these electron-beam accelerators, those of curtain beam system are, however, more preferable because of their comparatively low prices and high power output. Desirable electron beam characteristics can be obtained when an accelerating voltage is 100 to 1,000 KV, more particularly 150 to 300 KV, and a suitable absorption dose is 0.5 to 20 megarad, more particularly 2 to 10 megarad. When the accelerating voltage is less than 100 KV, energy of the electron beams is too low to permeate into the magnetic layer, whereas when it exceeds 1,000 KV, the efficiency of the energy used for polymerization is decreased, that is to say, economical efficiency is lowered. When the absorption dose is less than 0.5 megarad, the hardening reaction is incomplete and sufficient strength can not be imparted to the magnetic layer. However, when the absorption dose is more than 20 megarad, the efficiency of energy used for hardening is lowered and, an exothermic reaction is caused in the irradiated material to result in the deformation of the support, especially plastic supports, for example, polyethylene terephthalate, polyethylene 2,6-naphthalate, etc.

This invention will now be illustrated in greater detail be reference to the following examples and comparative examples.

However, this invention should not be construed as being limited to the following examples. In the following examples and comparative examples, all parts are by weight.

EXAMPLE 1

| | |
|---|---|
| $\gamma$-Fe$_2$O$_3$ | 100 parts |
| Acrylic Acid | 1 part |
| Methyl Ethyl Ketone | 150 parts |

The above-described ingredients were placed in a ball mill, and stirred for 24 hours. The resulting dispersion was air-dried under an ordinary pressure and then, dried at 60° C. under a reduced pressure to prepare a fine powder of iron oxide.

Magnetic Coating Composition:

| | |
|---|---|
| Fine Powder obtained above | 100 parts |
| Urethane Type Acrylate Olygomer | 10 parts |
| (Synthesized in the same manner as in Example 1 of U.S. Pat. No. 4,092,173) | |
| Diethylene Glycol Diacrylate | 5 parts |
| Nitrocellulose (Viscosity: RS$\frac{1}{2}$H) | 10 parts |
| Ester Type Polyurethane | 5 parts |
| (Molecular weight: 30,000) | |
| Myristic Acid | 1 part |
| Butyl Stearate | 1 part |

| | |
|---|---|
| —continued | |
| Methyl Ethyl Ketone | 200 parts |

The above-described composition placed in a ball mill, and kneaded for 50 hours. The thus obtained magnetic coating composition was coated on a 20 μm-thick polyethylene terephthalate film in a dry thickness of 6 μm using a doctor blade, oriented using a cobalt magnet, and dried to remove the solvent therefrom (for 1 minute at 100° C.). It was then subjected to a smoothening treatment using a 5-step calender comprised of a group of cotton rolls and specular rolls (at a roll temperature of 40° C. and a roll pressure of 100 kg/cm²).

Thereafter, it was irradiated with electron beams with an accelerating voltage of 200 KV, a beam current of 10 mA, and an absorption dose of 5 megarad. The thus obtained material was identified as Sample No. 1.

COMPARATIVE EXAMPLE 1

Another magnetic recording material was prepared in the same manner as in Example 1 except that γ-Fe₂O₃ which had not been subjected to the treatment with acrylic acid was used. This material was identified as Sample No. 2.

EXAMPLE 2

Still another magnetic recording material was prepared in the same manner as in Example 1 except that β-acryloyloxyethyl phosphate was used instead of acrylic acid. This material was identified as Sample No. 3.

EXAMPLE 3

| | |
|---|---|
| γ-Fe₂O₃ | 100 parts |
| Stearic Acid | 1 part |
| Methyl Ethyl Ketone | 150 parts |

The above-described ingredients were placed in a ball mill, and stirred for 24 hours. The resulting dispersion was air-dried and then, dried at 50° C. under a reduced pressure to obtain a fine powder.

Magnetic Coating Composition:

| | |
|---|---|
| Fine Powder obtained above | 100 parts |
| Nitrocellulose (Viscosity: RS½H) | 10 parts |
| Ester Type Polyurethane (Molecular weight: 30,000) | 10 parts |
| Adduct obtained by treating one mole of trimethylol propane with three moles of tolylene diisocyanate | 5 parts |
| Myristic Acid | 1 part |
| Butyl Stearate | 1 part |
| Methyl Ethyl Ketone | 300 parts |

The above-described composition was processed in the same manner as in Example 1 to form a dried magnetic coating. The coating was subjected to a calendering processing using a 5-step of calender with a roll temperature of 60° C. and a roll pressure of 100 kg/cm² and thereafter, it was subjected to a heat treatment at 60° C. for five straight days. The thus obtained material was identified as Sample No. 4.

COMPARATIVE EXAMPLE 2

A further magnetic recording material was prepared in the same manner as in Example 2 except that γ-Fe₂O₃ which had not been subjected to the treatment with stearic acid was used. This material was identified as Sample No. 5.

The samples prepared in Examples 1 to 3 and in Comparative Examples 1 and 2 were set in a video tape recorder. The tape-running was repeated 100 times to determine the kinetic coefficient of friction, the still durability (time) and the squareness ratio (ratio of residual magnetic flux density to maximum magnetic flux density). The results obtained are shown in Table.

(1) The kinetic coefficient of friction was measured using a VHS type video type recorder (MACLORD 88, model NV-8800, made by Matsushita Electric Industrial Co., Ltd.) in an atmosphere of 23° C. and 65% RH. Therein, the tape tension on the supply side of the rotating cylinder was indicated as being $T_1$, and tape tension on the take-up side was indicated as being $T_2$. If the influence of $T_1$ upon $T_2$ is intended to be excluded when $T_2$ is much greater than $T_1$, the coefficient of friction ($\mu$) can be defined by the following equation:

$$T_2/T_1 = \exp(\mu \cdot \pi)$$

The running tension was evaluated by this value $\mu$. Values determined when tape-running was repeated 100 times are shown in Table below.

(2) A video signal was recorded using a video tape recorder of the VHS type (model HR 3600, made by Victor Company of Japan, Limited), and the time at which the still image reproduced lost its clearness was measured (at 23° C. and 65% RH).

TABLE

| Sample No. | Kinetic Coefficient of Friction | Still Durability | Squareness Ratio | Condition of Magnetic Coating Composition After 24 Hrs' Standing |
|---|---|---|---|---|
| 1 (Present Invention) | 0.22 | 60 min or more | 0.85 | Not Separated |
| 2 (Comparison) | 0.32 | 30 min | 0.70 | Separated |
| 3 (Present Invention) | 0.23 | 60 min or more | 0.84 | Not Separated |
| 4 (Present Invention) | 0.25 | 60 min or more | 0.85 | Not Separated |
| 5 (Comparison) | 0.31 | 25 min | 0.71 | Separated |

As is apparent from the results shown in Table, the magnetic recording material prepared in accordance with the method of this invention has a kinetic coefficient of friction lower than that of Comparative Sample and has excellent electromagnetic characteristics. That is, the still durability of Sample Nos. 1, 3 and 4 (Present Invention) is 60 minutes or more as compared with 25 to 30 minutes of Sample Nos. 2 and 5 (Comparison), and the squareness ratio of Sample Nos. 1, 3 and 4 is higher than that of Sample Nos. 2 and 5. Further, the magnetic coating composition according to the present invention is stable even after 24 hours' standing.

While the invention has been described in detail and with reference to specific embodiment thereof, it will be apparent to one skilled in the art that various changes and modifications can be made therein without departing from the spirit and scope thereof.

What is claimed is:

1. A method for producing a magnetic recording medium which comprises the steps of (1) preparing ferromagnetic fine powder by the process comprising:
    (A) subjecting a composition to dispersion processing, wherein the composition comprises:

(i) a ferromagnetic powder;
(ii) a polar compound selected from the group consisting of acrylic acid, crotonic acid and bis($\beta$-acryloyloxyethyl)phosphate; and
(iii) an organic solvent capable of dissolving the polar compound; and (B) evaporating the organic solvent from the resulting composition, (2) dispersing said ferromagnetic fine powder of (1) in a binder comprising a compound polymerizable by irradiation with electron beams and has (meth)acryloyl groups at both ends of the molecule, (3) forming, on a support, a magnetic layer from the resulting composition and (4) irradiating the magnetic layer with electron beams.

2. A method as claimed in claim 1, wherein the polar compound is present in the composition in a portion of 0.5 to 2.0 wt% based on the weight of the ferromagnetic fine powder.

3. A method as claimed in claim 1, wherein the ferromagnetic fine powder is selected from the group of powders consisting of ferromagnetic iron oxide powder, ferromagnetic chromium dioxide powder and ferromagnetic alloy powder.

4. A method as claimed in claim 3, wherein the ferromagnetic fine powder comprising ferromagnetic iron oxide or ferromagnetic chromium dioxide particles having an axial ratio ranging from about 2:1 to about 20:1 and an average length in the range of about 0.2 to about 2.0 $\mu$m.

5. A method as claimed in claim 3, wherein the ferromagnetic fine powder comprises ferromagnetic alloy particles having a length of about 1.0 $\mu$m or shorter.

6. A method as claimed in claim 1, wherein the evaporating of the organic solvent is carried out by heating to a temperature within the range of about 80° C. to about 100° C.

7. A method as claimed in claim 6, wherein the evaporation of the organic solvent is carried out until the remaining unevaporated organic solvent is present in an amount of 5 wt% or less based on the weight of the ferromagnetic fine powder.

* * * * *